(12) United States Patent
Ucan

(10) Patent No.: US 7,077,021 B2
(45) Date of Patent: Jul. 18, 2006

(54) SENSOR DEVICE ON A FEED PIPELINE CARRYING HIGH VOLTAGE

(75) Inventor: Aydin Ucan, Ludwigsburg (DE)

(73) Assignee: Eisenmann Lacktechnik KG (Komplementar: Eisenmann-Stiftung) (DE)

( * ) Notice: Subject to any disclaimer, the term of this patent is extended or adjusted under 35 U.S.C. 154(b) by 234 days.

(21) Appl. No.: 10/708,343

(22) Filed: Feb. 25, 2004

(65) Prior Publication Data

US 2004/0226391 A1    Nov. 18, 2004

(30) Foreign Application Priority Data

Feb. 28, 2003  (DE) ................. 103 09 143

(51) Int. Cl.
G01M 19/00    (2006.01)
F16L 55/48    (2006.01)
B05B 15/00    (2006.01)
B05C 11/00    (2006.01)

(52) U.S. Cl. .................... 73/865.9; 73/866.1
(58) Field of Classification Search ............. 73/865.9, 73/866.1
See application file for complete search history.

(56) References Cited

U.S. PATENT DOCUMENTS

| | | | | |
|---|---|---|---|---|
| 2,601,248 A | * | 6/1952 | Brenholdt ................. 324/67 |
| 3,384,512 A | * | 5/1968 | Frederick et al. ............. 134/8 |
| 5,328,093 A | * | 7/1994 | Feitel ...................... 239/3 |
| 6,071,348 A | * | 6/2000 | Seitz et al. ................ 118/712 |
| 2003/0016028 A1 | * | 1/2003 | Bass ...................... 324/642 |
| 2003/0020499 A1 | * | 1/2003 | Bass ...................... 324/721 |
| 2004/0069961 A1 | * | 4/2004 | Albrecht et al. .......... 250/559.4 |
| 2004/0075848 A1 | * | 4/2004 | Baumann et al. ........... 356/622 |

FOREIGN PATENT DOCUMENTS

| | | |
|---|---|---|
| DE | 39 01 891 A1 | 7/1990 |
| DE | 44 05 662 A1 | 2/1995 |
| DE | 44 06 046 C2 | 11/1997 |
| DE | 197 38 097 C2 | 1/2000 |
| EP | 1 232 799 A2 | 8/2002 |
| EP | 1 319 439 A1 | 12/2002 |
| FR | 1327274 * | 5/1963 |
| JP | 08166351 A * | 6/1996 |
| JP | 09054049 A * | 2/1997 |

* cited by examiner

*Primary Examiner*—Thomas P. Noland
(74) *Attorney, Agent, or Firm*—Factor & Lake

(57) ABSTRACT

In order to be able to operate a sensor device on a feed pipeline carrying high voltage without using batteries or storage batteries, the sensors are connected for supply purposes via an electrical isolating stage to a mains voltage source and for signal purposes to an evaluation circuit.

8 Claims, 3 Drawing Sheets

SENSOR DEVICE ON A FEED PIPELINE CARRYING HIGH VOLTAGE

SUMMARY OF INVENTION

The invention relates to a sensor device on a feed pipeline carrying high voltage in accordance with the preamble of Claim 1.

Feed pipelines sometimes carry electrical potential. An example of this are feed pipelines for lacquers that feed a spraying system with which the lacquer is applied to a workpiece with the aid of an electrostatic field. To change the colour in such pipelines, pipeline scrapers are used that are able to empty a pipeline section of lacquer after the fashion of displacement pistons, are able to permit filling with a cleaning liquid and are then also able to displace the cleaning liquid out of the pipeline again. Such pipeline scrapers can also be used as separating pistons between different colours that follow one another.

During normal operation of the lacquering system, said pipeline scrapers are parked in pipeline-scraper stations so that the lacquer can flow unimpeded through the lacquer feed pipeline. To control the colour change, it is important to detect when a pipeline scraper has reached its rest position in a pipeline-scraper station. Reaching the rest position is detected using sensors that respond to the presence of a pipeline scraper.

With regard to the high voltage that the feed pipeline and, consequently, also the pipeline-scraper station carry, sensors that are operated from a battery were hitherto used for pipeline-scraper detection. In this way, an electrical isolation from the environment is readily achieved. However, operation of the sensors incurs the costs of the batteries and changing a battery always necessitates undesirable shutdown times of the entire system.

The aim of the present invention is therefore to develop a sensor device in accordance with the preamble of Claim 1 in such a way that the sensors of the sensor device can be supplied from a mains.

This object is achieved according to the invention by a sensor device having the features specified in Claim 1.

In the case of the sensor device according to the invention, the sensor itself can be at high potential. Both its energy supply and the tapping of the signals generated by it take place using an electrical isolating stage. Consequently, batteries for supplying energy are unnecessary.

The sensors used may be inductive sensors, capacitive sensors, magnetically actuated sensors, such as Reed relays, mechanically actuated sensors, optical sensors or other sensors. The measured quantity ultimately registered does not need to be the position of a pipeline scraper and other properties of interest on the feed pipeline may also be measured, for example the temperature of the stock moving in the feed pipeline, electrical properties of said stock, the colour of the stock fed, the throughput of the stock fed, etc.

Advantageous developments of the invention are specified in the subclaims.

In the case of a sensor device in accordance with Claim 2, a plurality of sensors, possibly also corresponding to different measurement parameters, may be connected to the voltage supply and the evaluation circuit via a single electrical isolation-stage arrangement.

The development of the invention in accordance with Claim 6 achieves the result that the paths via which connecting cables, likewise at high voltages, extend to the isolating stage arrangement are only short.

An electrical isolation, such as that specified in Claim 7, can be achieved at especially low costs and is suitable, in particular, for the energy supply to the sensors associated with power transmission.

An electrical insulation in accordance with Claim 8 is also notable for low costs. This coupling is especially suitable for signal transmission.

The development of the invention in accordance with Claim 3 achieves the result that conductors carrying signals at high voltages need to be provided only once and need to extend only in the immediate environment of the sensors. In accordance with Claim 3, a very large number of sensors can also readily be connected to the evaluation circuit.

BRIEF DESCRIPTION OF DRAWINGS

The invention is explained in greater detail below on the basis of exemplary embodiments with reference to the drawing. In the latter.

DETAILED DESCRIPTION

Figure 1:
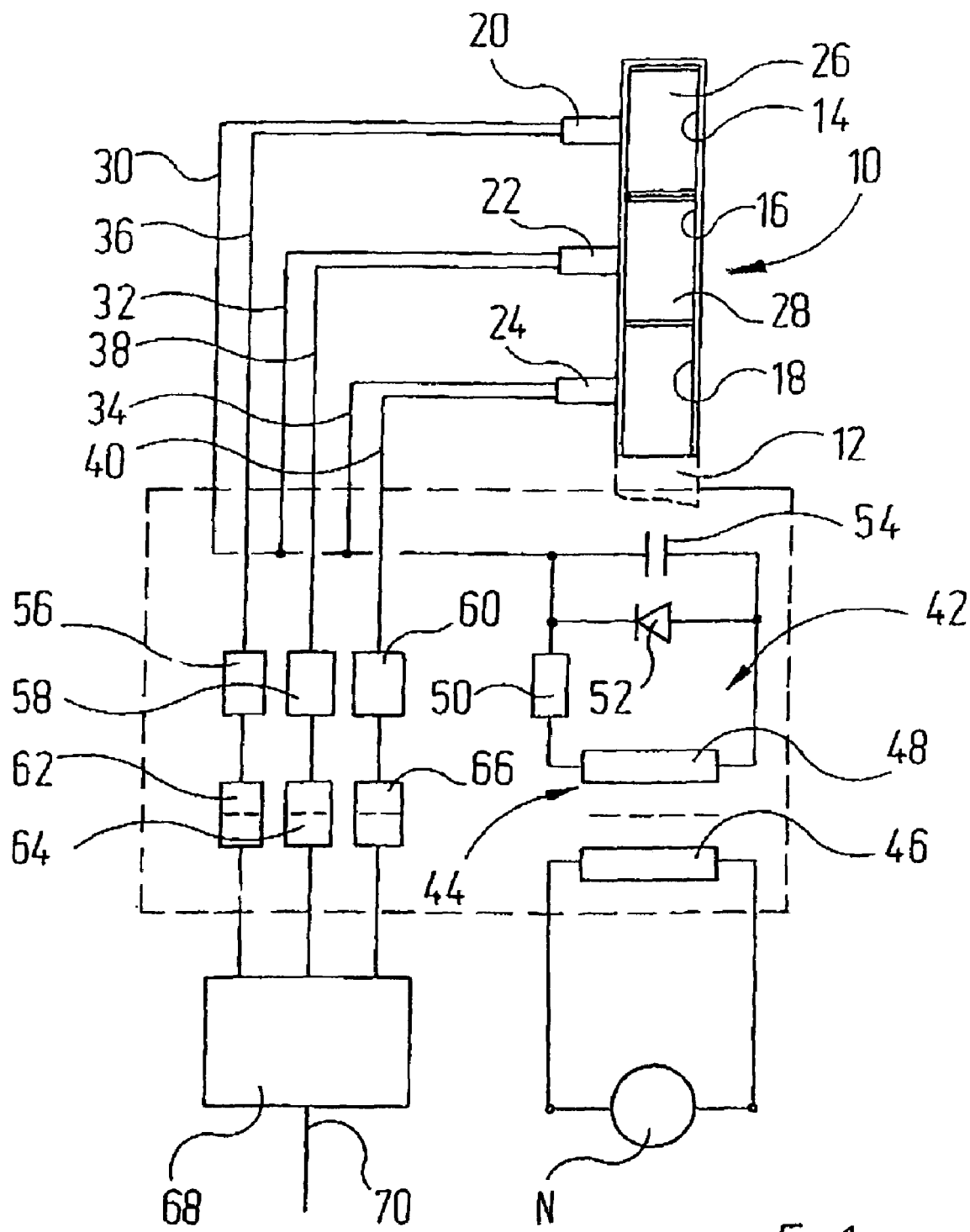
FIG. 1 shows a block circuit diagram of a sensor device that can detect the presence of a pipeline scraper at three different positions in a pipeline-scraper station and is operated from a power pack.

In FIG. 1, 10 denotes in its entirety a pipeline-scraper station that is connected to the end of a feed pipeline 12. The feed pipeline 12 serves to feed lacquer that is drawn in by a pump, not shown, from a feedstock container to a spraying system that is not shown and from which the lacquer is applied to a workpiece, for example coachwork, with the additional aid of an electrostatic field.

The pipeline-scraper station 10 has three parking regions 14, 16, 18, that are each equipped with a sensor 20, 22, 24 that is supported by the pipeline wall. A scraper 26, 28 is shown in each of the upper parking regions 14 and 16.

The sensors 20, 22, 24 are intended, for example, always to provide a high-level signal if a pipeline scraper is situated in their vicinity. If there is no pipeline scraper there, the sensors 20, 22, 24 emit a low-level signal.

Connected to the sensors 20, 22, 24 are signal lines 30, 32, 34 that carry the sensor output signals.

The sensors are supplied with electrical energy necessary for their operation via supply lines 36, 38, 40.

The supply lines 36, 38, 40 are connected to the output of a low-voltage mains section denoted in its entirety by 42 that provides, for example, a direct voltage of 24V, such as is used to operate many standard commercial inductive sensors.

The mains section 42 comprises an isolating transformer 44 having a primary coil 46 connected to an alternating-voltage mains N and a secondary coil 48 that is electrically isolated from the primary coil. The output signal of the secondary coil 48 is rectified by means of a rectifier indicated diagrammatically by a resistor 50, a diode 52 and a capacitor 54.

The isolating transformer 44 is an electrical isolating stage serving the purpose of supply.

The signal lines 30, 32, 34 are connected to the inputs of operating circuits 56, 58, 60 that shape the signals obtained and, optionally, convert them into another signal representation, for example into serial digital representation. For this purpose, the operating circuits 56, 58, 60 may also comprise A/D converters if used with sensors providing analog output signals.

In the case of inductive and capacitive sensors, the operating circuits 56, 58, 60 may also comprise oscillators for generating the alternating voltage that is used to operate the sensors and threshold detectors for detecting amplitude or phase changes in the signals carried on the signal lines 30, 32, 34.

The outputs of the operating circuits 56, 58, 60 carrying the processed output signals of the sensors 20, 22, 24 are connected to the inputs of optocouplers 62, 64, 66 that may comprise, in a conventional way, a collaborative component pair comprising an LED and a photodiode or a phototransistor.

The optocouplers 62, 64, 66 are an electrical isolating stage serving the purpose of signal transmission.

The outputs of the optocouplers 62, 64, 66 are connected to the input of an evaluation circuit 68.

Via an output cable 70, the latter is able to inform a machine control system about how many pipeline scrapers are in the parking regions 14, 16, 18 of the pipeline-scraper station 10.

It is evident that the above-described sensor device for pipeline-scraper detection at a pipeline-scraper terminal station operates without a battery or storage battery, which make a replacement necessary at specified intervals. The sensors 20, 22, 24 used may be conventional low-voltage sensors.

Figure 2:
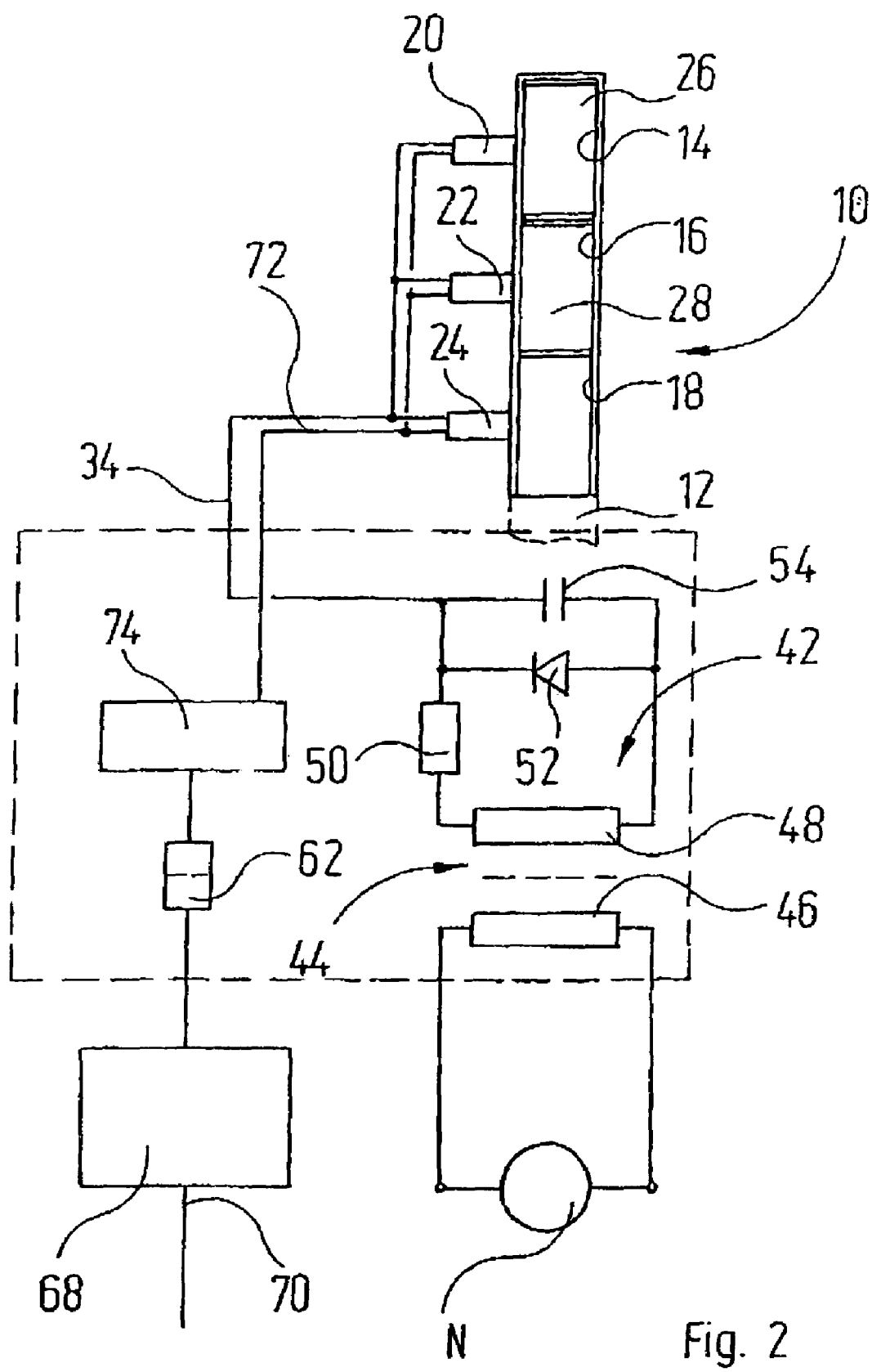
FIG. 2 shows a circuit diagram similar to FIG. 1, but in which the various sensors are connected to a databus; and, FIG. 3 shows a circuit diagram similar to FIG. 2, but in which a wireless modem is used as an isolating stage.

The exemplary embodiment according to FIG. 2 largely corresponds to that according to FIG. 1 with the proviso that the sensors 20, 22, 24 are connected for signal purposes to a common databus 72. Connected to the databus 72 is a bus controller 74 that organizes the connection of the sensors 20, 22 and 24 to the databus 72 according to a specified time pattern and requires the sensors to emit a data packet by a special code for each of them. Said data packet comprises an identifier for the respective sensor and a digital measured value.

The bus controller 74 emits at its output at specified intervals data packets that reproduce the totality of the states measured by the sensors 20, 22, 24. The output of the bus controller 74 is connected to an optocoupler 62, as described above.

In other respects, the sensor device according to FIG. 2 operates similarly to that according to FIG. 1.

Figure 3:
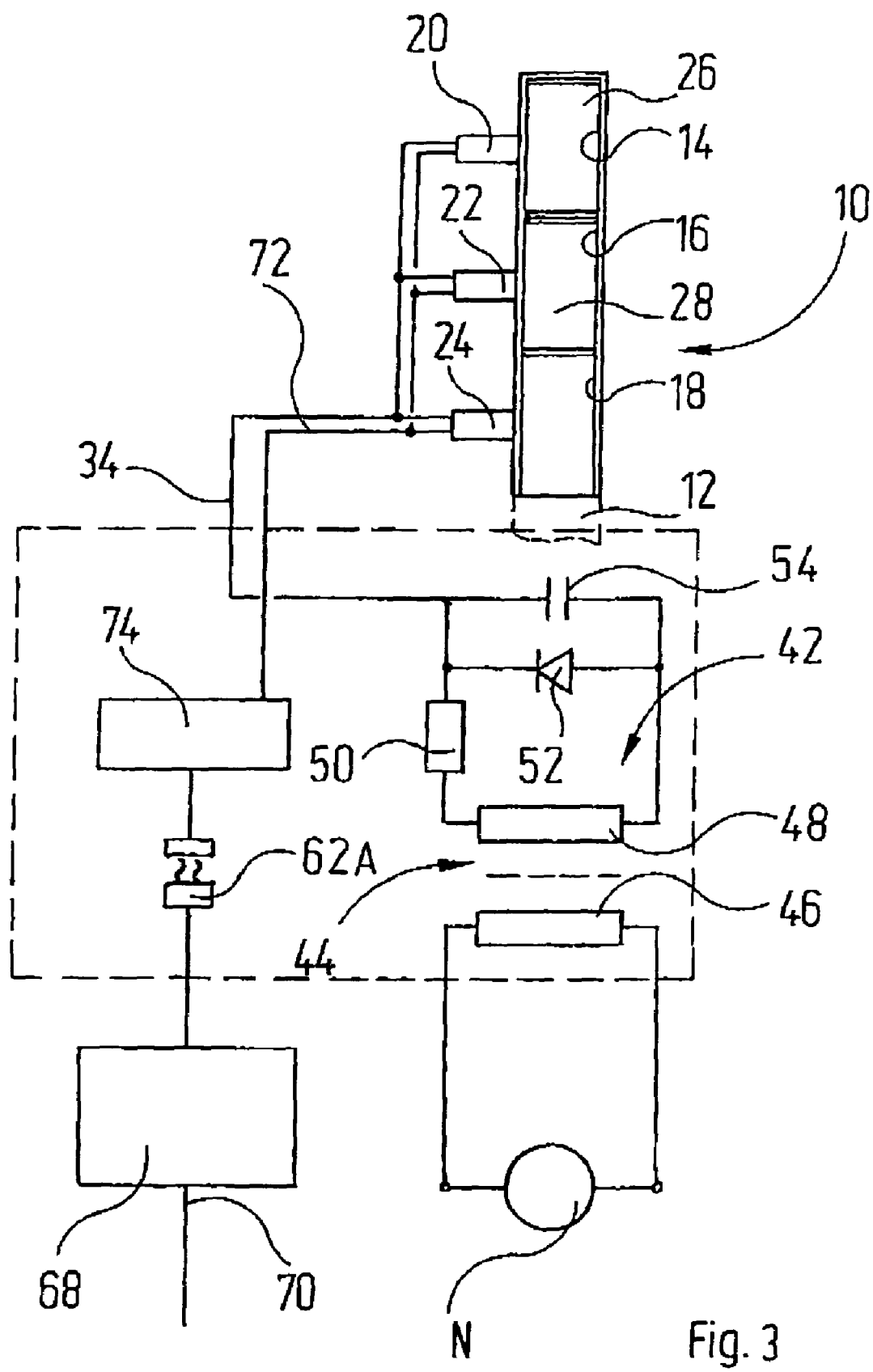

As a modification of the exemplary embodiment according to FIG. 2, the optocoupler 62 can also be replaced by a wireless modem 62A (see FIG. 3) that is then the isolating stage serving the purpose of signal transmission.

The invention claimed is:

1. Sensor device on a feed pipeline carrying high voltage, comprising at least one sensor that is disposed on the pipeline and that provides a low-level output signal, and comprising an evaluation circuit to which sensor signal output is applied, characterized in that at least one sensor is operated from a mains-voltage source via an electrical isolating stage and the at least one sensor is connected to the evaluation circuit via an electrical isolating stage or wirelessly.

2. Sensor device according to claim 1, characterized in that a plurality of sensors is connected to the mains-voltage source and the evaluation circuit via the electrical isolating stages.

3. Sensor device according to claim 2, characterized in that the at least one sensor each provide a data packet that comprises a sensor output signal and, in that the plurality of sensors is connected to a databus that is connected to one of the electrical isolating stages.

4. Sensor device according to claim 3, wherein the data packet further comprises a sensor identifier.

5. Sensor device according to claim 2, characterized in that the electrical isolating stages are disposed in the vicinity of the plurality of sensors.

6. Sensor device according to claim 1, characterized in that the electrical isolating stages are disposed in the vicinity of the at least one sensor.

7. Sensor device according to claim 1, characterized in that at least one of the electrical isolating stages comprises a transformer.

8. Sensor device according to claim 1, characterized in that at least one of the isolating stages comprises an optocoupler unit.

* * * * *